3,003,922
METHOD FOR PRODUCING L-PYRROLIDONE-CARBOXYLIC ACID AND ITS SALT

Shukuo Kinoshita, Katsunobu Tanaka, and Sadao Akita, Tokyo, and Yoshiki Maruta and Yoshihisa Yamamoto, Hofu-shi, Japan, assignors to Kyowa Hakko Kogyo Co., Ltd., Tokyo, Japan, a corporation of Japan
No Drawing. Filed Nov. 4, 1959, Ser. No. 850,754
Claims priority, application Japan Nov. 10, 1958
5 Claims. (Cl. 195—29)

The present invention is concerned with the production of L-pyrrolidone carboxylic acid, more particularly it relates to the method of producing L-pyrrolidone carboxylic acid by acting a micro-organism or enzyme thereof on an aqueous solution containing L-glutamic acid.

The known chemical processes for the production of L-pyrrolidone carboxylic acid are ones in which a L-glutamic acid solution is heated at an elevated temperature for a long period. This reaction always is accompanied with the formation of the DL-body. If the prevention of the DL-body formation is desired, the reaction must be carried out more moderately and gradually in an acidic solution. Such a process is obviously unfavorable from an industrial view point. Besides, this reaction does not proceed to more than the equilibrium point so that some of the L-glutamic acid remains as it was and must be separated from the object product.

When L-glutamic acid is recovered from an L-glutamic acid-containing solution, e.g. the hydrolysis product of animal or vegetable protein, Steffen's filtrate or a cultured solution of microorganisms, L-glutamic acid may more easily be separated after converting said L-glutamic acid into L-pyrrolidone carboxylic acid than it is separated directly. This is because the above material solutions usually include various kinds of impurities such as other amino acids and inorganic materials. The separated L-pyrrolidone carboxylic acid may be easily reconverted into L-glutamic acid chemically by hydrolysis. The L-glutamic acid product is used as a flavoring agent or flavor enhancer for a variety of food products.

L-pyrrolidone carboxylic acid and L-glutamic acid in the present invention comprise their salts, for instance, sodium-, potassium-, ammonium-, etc. More particularly, L-pyrrolidone carboxylic acid indicates L-2-pyrrolidone-5-carboxylic acid.

An object of the invention is to provide a method of producing L-pyrrolidone carboxylic acid in exceedingly facile way and in an excellent yield as compared with the chemical process heretofore known.

Another object of the invention is to provide a method wherein those defects which the known method has are completely eliminated, and L-glutamic acid can be converted into L-pyrrolidone carboxylic acid in substantially quantitative yield at almost neutral condition within a short period by use of a micro-organism or enzyme thereof.

Other objects and advantages will be apparent from the ensuing description of the invention.

It has not yet been discovered that micro-organism has the enzymatic action of converting L-glutamic acid into a pyrrolidone. Accordingly, it may be said that the present invention proposes quite a new method, and that a novel, useful, industrial method for converting L-glutamic acid into a pyrrolidone is now established.

The inventions have found that *Pseudomonas cruciviae* Gray and Thornton is a microorganism having a function of converting L-glutamic acid into a pyrrolidone. This microorganism is a known species, cultures of which are available in public culture collections. Said microorganism may be isolated from soil, and identified by published descriptions, such as, "Bergey's Manual of Determinative Bacteriology," Breed, Robert S., Murray, E.G.D., and Smith, Nathan R., seventh edition, The Williams & Wilkins Company, Baltimore, Md., 1957, for use in the present process.

The process of producing L-pyrrolidone carboxylic acid from L-glutamic acid according to the invention will be more fully explained by the following experimental example.

*Experimental example.*—A strain of *Pseudomonas cruciviae* Gray and Thornton is cultivated in the following culture medium at the temperature of 28° C. for 20 hours under shaking to grow the microorganism.

The composition of the culture medium:

| | Grams per 100 milliliters |
|---|---|
| Glucose | 0.5 |
| Yeast extract | 0.5 |
| Casein hydrolysate (calculated as casein) | 2 |
| $K_2HPO_4$ | 0.1 |
| $MgSO_4 \cdot 7H_2O$ | 0.025 |
| Water | The balance |
| pH | About 6.8 |

Two milliliters of the resulting cell suspension is added to 6 ml. of a solution containing L-glutamic acid to make reaction mixtures. Three mixtures are made in which concentrations of L-glutamic acid being adjusted so as to be 30 mg./ml., 50 mg./ml., and 70 mg./ml., respectively.

The pH of the reaction mixture is adjusted in a range from 7.0 to 9.0 and the mixture held at the temperature of 35° C. for 6 hours. The results of analysing the reaction mixture are shown in Table 1, which indicate that L-glutamic acid in the reaction mixture has been converted into L-pyrrolidone carboxylic acid almost quantitatively.

Table 1

| prior to the reaction | | posterior to the reaction | |
|---|---|---|---|
| L-glutamic acid content (mg./ml.) | L-pyrrolidone carboxylic acid content (mg./ml.) | L-glutamic acid content (mg./ml.) | L-pyrrolidone carboxylic acid content (mg./ml.) [1] |
| 30 | 0 | trace | 29.8 |
| 50 | 0 | trace | 49.3 |
| 70 | 0 | trace | 69.2 |

[1] The values are of L-pyrrolidone carboxylic acid hydrolysed by 2 N HCl and determined as L-glutamic acid.

When the cells are separated from the suspension containing same, and 1 g. of the resulting cells is inoculated to a solution containing 100 g. of L-glutamic acid, almost a quantitative amount of L-pyrrolidone carboxylic acid is obtained.

Any culture medium may be employed for the growth of microorganism in the present invention so far as it contains proper amounts of carbohydrate available by the species, the source of nitrogen, inorganic compounds, etc. The temperature for cultivation is preferably 25° to 33° C. Ordinarily, 15 to 30 hours' aerobic cultivation gives a cell suspension necessary for the reaction.

The resulting cell suspension may be used as it is for the reaction with a solution containing L-glutamic acid, or cells separated from the suspension may be used. Alternatively, cell homogenates obtained by conventional methods, such as supersonic vibrations, or the enzyme obtained from it may be employed for the reaction of the invention. The enzyme is prepared, for example, from the cells in partially purified form as follows: (i) 8 gram portions of the lyophilized cells are treated with 10 kilo-cycles supersonic at 0 to 3° C. in 80 milliliters of M/15 phosphate buffer for 30 minutes. (ii) After centrifugation at 8000 g. for 10 minutes, the supernatant is allowed to stand in a 70° C. water bath for 30 minutes. (iii) After centrifugation its supernatant (85 milliliters) is treated with 45 milliliters saturated ammonium sulfate solution at 0° C. (to give 0.28 saturation). After 20 hours, the precipitate is removed and discarded. Its supernatant (127 milliliters) is now brought to 0.62 saturation by addition of ammonium sulfate powder. The resulting precipitate is removed by centrifuge, and lyophilized.

The maximum yield is attained at pH of the reaction mixture from 6 to 9. The starting reaction mixture may contain about 10 to 100 milligrams, preferably 30 to 70 milligrams, of L-glutamic acid per milliliter. The reaction temperature may be varied in a wide range from 20° to about 60° C., although it is found that the higher the temperature is, the higher the reaction velocity is in general. The reaction period may be varied depending upon the reaction conditions, but a duration of approximately 5 to 10 hours usually suffices.

For recovery of L-pyrrolidone carboxylic acid from the reaction mixture after the completion of the reaction, the suspended cells and/or other insoluble materials, if any, may be separated in a conventional way, for example by filtration, centrifuging or other ways. The resulting clear solutions are acidified, if required, by means of a dilute mineral acid, such as dilute sulfuric acid.

The solution may then be extracted with a suitable solvent for pyrrolidone carboxylic acid, for example isoamyl alcohol, benzyl alcohol, isobutyl alcohol, normal-butyl alcohol, acetic esters, and the like, and thereafter the solvent is removed, for example by distillation or evaporation, to yield crude crystals of L-pyrrolidone carboxylic acid, which may further be purified by the known procedure, if required.

The invention will be further explained in connection with the following working example, which is to be construed as by way of illustration and not by way of limitation.

*Working example.*—A strain of *Pseudomonas cruciviae* Gray and Thornton was inoculated to the same culture medium as the experimental example, and cultivated at the temperature of 28° C. for 20 hours under shaking to yield a cell suspension. Twenty milliliters of the cell suspension was added to 60 ml. of a solution containing L-glutamic acid, the concentration of L-glutamic acid in the reaction mixture being so adjusted as to be 50 mg./ml., and the pH being adjusted to 7.0. The mixture was kept at 35° C. for 6 hours.

After said time, a mixture was obtained which contained a trace of L-glutamic acid and an amount of L-pyrrolidone carboxylic acid corresponding to 49.4 mg./ml. of glutamic acid.

The mixture was filtered and the pH of the filtrate was adjusted to 2 by means of dilute sulfuric acid. To the resulting solution, there was added 320 ml. of isoamyl alcohol and the mixture was repeatedly shaken to effect the extraction of the products. Isoamyl alcohol extract was, after separation, evaporated to leave 3.2 g. of crude crystals of L-pyrrolidone carboxylic acid.

We claim:
1. A method for producing L-pyrrolidone carboxylic acid, which comprises acting at a pH of from 6 to 9 at least one member selected from the group consisting of *Pseudomonas cruciviae* Gray and Thornton and enzyme thereof, on an aqueous solution containing L-glutamic acid, the resulting starting reaction mixture containing from 10 to 100 mg./ml. of L-glutamic acid and recovering L-pyrrolidone carboxylic acid from the resulting mixture.

2. The method according to the claim 1 wherein an aqueous suspension of said micro-organism is added to said solution.

3. The method according to the claim 1 wherein cells of said micro-organism separated from the culture medium are added to said solution.

4. The method according to the claim 1 wherein cell homogenate of said micro-organism is added to said solution.

5. The method according to the claim 1 wherein the enzyme obtained from the micro-organism is used.

References Cited in the file of this patent

Nature: Feb. 25, 1956, pp. 377 to 378, article by Connell et al.

Journal of Biological Chemistry, vol. 225, pp. 825 to 834, 1957, article by Strecker.

Journal of Bacteriology, article by Noe et al., vol. 75, pp. 674 to 681, published June 1958, The Williams and Wilkins Co., Baltimore, Md.